(12) United States Patent
Li et al.

(10) Patent No.: US 12,483,371 B2
(45) Date of Patent: Nov. 25, 2025

(54) LAYER-1 REFERENCE SIGNALING OUTSIDE OF CARRIER BANDWIDTHS

(71) Applicant: Apple Inc., Cupertino, CA (US)

(72) Inventors: Qiming Li, Beijing (CN); Yang Tang, San Jose, CA (US); Manasa Raghavan, Sunnyvale, CA (US); Dawei Zhang, Saratoga, CA (US); Jie Cui, San Jose, CA (US); Xiang Chen, Campbell, CA (US); Fangli Xu, Beijing (CN); Rolando E Bettancourt Ortega, Munich (DE); Yuexia Song, Beijing (CN)

(73) Assignee: Apple Inc., Cupertino, CA (US)

( * ) Notice: Subject to any disclaimer, the term of this patent is extended or adjusted under 35 U.S.C. 154(b) by 231 days.

(21) Appl. No.: 18/355,675

(22) Filed: Jul. 20, 2023

(65) Prior Publication Data
US 2024/0031102 A1    Jan. 25, 2024

Related U.S. Application Data

(60) Provisional application No. 63/396,292, filed on Aug. 9, 2022.

(51) Int. Cl.
*H04L 5/00* (2006.01)
(52) U.S. Cl.
CPC .......... *H04L 5/0051* (2013.01); *H04L 5/0064* (2013.01); *H04L 5/0092* (2013.01)

(58) Field of Classification Search
CPC ... H04L 5/0051; H04L 5/0064; H04L 5/0092; H04L 5/0094; H04L 5/0048
See application file for complete search history.

(56) References Cited

U.S. PATENT DOCUMENTS

2019/0089568 A1* 3/2019 Abedini .................. H04L 5/003
2021/0273758 A1* 9/2021 Liu .......................... H04L 5/005

OTHER PUBLICATIONS

RAN2; "LS on BWP operation without bandwidth restriction"; 3GPP TSG RAN WG2#117-e; R2-2204009; Feb. 21, 2022.
Apple; "WF on R17 gap coordination and BWP operation without BW restriction"; 3GPP TSG-RAN WG4 Meeting #103e; R4-2211219; May 9, 2022.

* cited by examiner

*Primary Examiner* — Charles C Jiang
(74) *Attorney, Agent, or Firm* — Eschweiler & Potashnik, LLC; Matthew W Glause

(57) ABSTRACT

Techniques discussed herein can facilitate transmission and reference signals (RS) associated with layer-1 (L1) operations outside of a configured carrier bandwidth (CBW) of a user equipment (UE). One example aspect is a UE with one or more processors configured to transmit UE capability information. The UE capability information includes a frequency separation threshold, where the frequency separation threshold represents a frequency separation from a CBW of the UE. The one or more processors are further configured to receive a RS within the frequency separation threshold and outside of the CBW, and subsequently perform a L1 operation based on the RS.

20 Claims, 13 Drawing Sheets

LAYER-1 REFERENCE SIGNALING OUTSIDE OF CARRIER BANDWIDTHS

RELATED APPLICATIONS

This Application claims the benefit of U.S. Provisional Application No. 63/396,292, filed on Aug. 9, 2022, the contents of which are hereby incorporated by reference in their entirety.

FIELD

The present disclosure relates to wireless technology including New Radio (NR) radio layer-1 (L1) reference signaling (RS) and carrier bandwidths (CBW).

BACKGROUND

Mobile communication in the next generation wireless communication system, 5G, or new radio (NR) network will provide ubiquitous connectivity and access to information, as well as the ability to share data, around the globe. 5G networks and network slicing will be a unified, service-based framework that will target to meet versatile, and sometimes conflicting, performance criteria. 5G networks will provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

DETAILED DESCRIPTION

The present disclosure relates to transmission and reception of reference signals (RS) associated with layer-1 (L1) operations outside of a configured carrier bandwidth (CBW) of a user equipment (UE).

As New Radio (NR) fifth generation (5G) and future communication standards develop, bandwidth flexibility between a UE and a core network (CN) can enhance network protocols for L1 operations. For example, a L1 operation can include one or more of beam level mobility (BM), radio link monitoring (RLM), or beam failure detection and recovery (BFD). The CN can communicate, through a base station (BS), a reference signal such as a synchronization signal block (SSB) or channel state information reference signal (CSI-RS), indicating the L1 operation. Typically, the RS may be configured in a downlink (DL) bandwidth part (BWP) of the UE, otherwise the UE may not receive the RS. For example, if the RS is transmitted outside of an active BWP of the UE, and further outside of a CBW of the UE, the RS may not be received by the UE. In some instances, however, there may be benefits to transmission of a RS outside of an active BWP or a configured bandwidth of the UE. For example, the CBW of the UE may be a congested band where reception of the RS within the CBW may be unlikely or delayed. In another example, the BS may transmit a common RS to multiple UEs, where a common RS is in a CBW of some UEs and outside of a CBW of other UEs. As such, the UE can indicate to a BS, through a UE capability signaling, that the UE supports receiving the RS outside of the CBW. When the UE supports receiving the RS outside of the CBW, communication systems can enable bandwidth flexibility when signaling the RS. The BS or CN may determine to apply resource restrictions or resource optimization resulting in optimal RS transmissions outside of the CBW of the UE rather than RS transmissions within the CBW.

Various aspects of the present disclosure are directed towards transmission and reception of RS associated with L1 operations outside of the CBW of a UE. Mechanisms by which the UE can communicate a UE capability that includes a frequency separation threshold (FST) between the CBW and RS, and within a configurable bandwidth of the UE is presented herein. Mechanisms by which the UE can prioritize reception of the RS, schedule interruption services to receive the RS, and reconfigure the UE's bandwidth to receive the RS are presented herein. Mechanisms by which the UE can receive the RS outside of the FST are presented herein where the BS can configure a measurement gap for the UE to measure the RS during the measurement gap.

As such, aspects presented herein provide for bandwidth enhancements and flexibility where the RS is communicated to the UE outside of the CBW of the UE, thus enabling frequency spectrum optimization options for the communication network.

Figure 1:
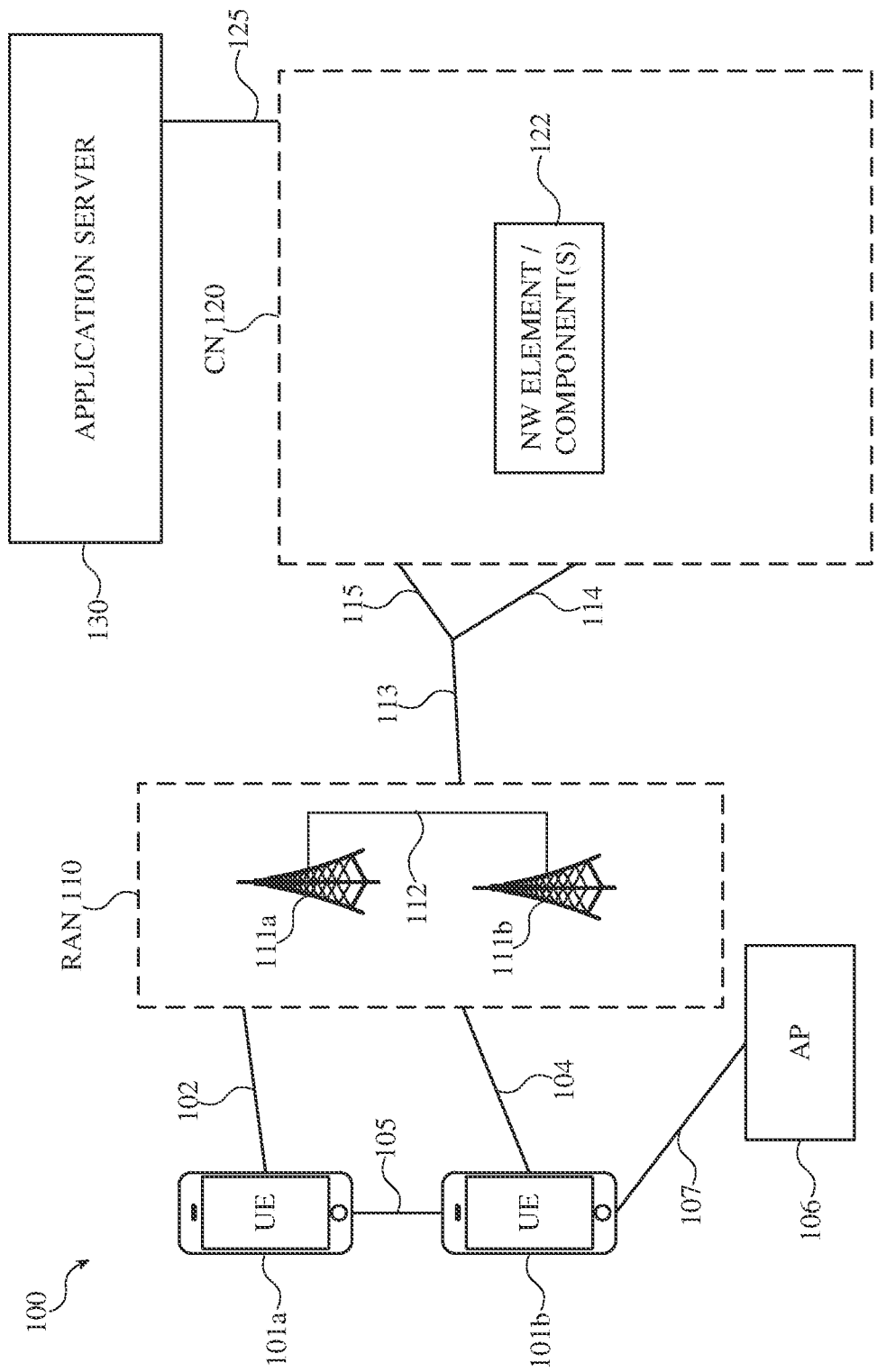
FIG. 1 is an exemplary block diagram illustrating an example of user equipment(s) (UEs) communicatively coupled to a network in accordance with various aspects described herein.

FIG. 1 illustrates an example architecture of a wireless communication system 100 of a network that includes UE 101a and UE 101b (collectively referred to as "UEs 101" or "UE 101"), a radio access network (RAN) 110, and a core network (CN) 120. The UEs communicate with the CN 120 by way of the RAN 110. In aspects, the RAN 110 can be a next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system, and the term "E-UTRAN" or the like can refer to a RAN 110 that operates in an LTE or 4G system. The UEs 101 utilize connections 102 and 104 (or channels), respectively, each of which comprises a physical communication interface/layer. Connections 102 and 104 (also referred to as channels) can facilitate one or more of licensed or unlicensed communication bands between the UE 101 and the RAN 110.

Alternatively, or additionally, each of the UEs 101 can be configured with dual connectivity (DC) as a multi-RAT or multi-Radio Dual Connectivity (MR-DC), where a multiple Rx/Tx capable UE may be configured to utilize resources provided by two different nodes (e.g., 111a, 111b, 112, or other network nodes) that can be CONNECTED via non-ideal backhaul, one providing NR access and the other one providing either E-UTRA for LTE or NR access for 5G, for example.

Alternatively, or additionally, each of the UEs 101 can be configured in a CA mode where multiple frequency bands are aggregated amongst component carriers (CCs) to increase the data throughput between the UEs 101 and the base station (BS) 111a or the BS 111b. For example, UE 101a can communicate with BS 111a according to the CCs in CA mode. Furthermore, UE 101a can communicate with BS 111 in a DC mode simultaneously and additionally communicate with each node of BS 111 in the CA mode.

In this example, the connections 102 and 104 are illustrated as an air interface to enable communicative coupling. In aspects, the UEs 101 can directly exchange communication data via a ProSe interface 105. The ProSe interface 105 can alternatively be referred to as a sidelink (SL) interface and can comprise one or more logical channels. In other aspects, the ProSe interface 105 can be a direct (peer-to-peer) communication.

The RAN 110 can include one or more access nodes (AN) or RAN nodes (collectively referred to as "RAN nodes" or "RAN node") that enable the connections 102 and 104. As used herein, the terms "access node," "access point," or the like can describe equipment that provides the radio baseband functions for data and/or voice connectivity between a network and one or more users. These access nodes can be referred to as a base station (BS), next generation base station (gNBs), RAN nodes, evolved next generation base station (eNBs), NodeBs, RSUs, Transmission Reception Points (TRxPs) or TRPs, and so forth. As such, the RAN 110 can include BS 111a and/or BS 111b.

In aspects where the wireless communication system 100 is a 5G or NR system, the interface 112 can be an Xn interface. The Xn interface is defined between two or more BS 111 (e.g., two or more gNBs, BSs, and the like) that connect to 5GC 120, between a BS 111 (e.g., a gNB, or a RAN node) connecting to 5GC 120 and an eNB, and/or between two eNBs connecting to 5GC 120.

The UE 101 and the BS 111 may utilize a Uu interface to exchange control plane data via a protocol stack comprising the PHY layer (e.g., layer 1 (L1)), the MAC layer (e.g., layer 2 (L2)), the RLC layer, the PDCP layer, and the radio resource control (RRC) layer (e.g., layer 3 (L3)). The Uu interface can be one or more of connections 102 and 104.

In aspects, the CN 120 can be a 5GC (referred to as "5GC 120" or the like), and the RAN 110 can be CONNECTED with the CN 120 via a next generation (NG) interface 113. In aspects, the NG interface 113 can be split into two parts, a NG user plane (NG-U) interface 114, which carries traffic data between the BS 111 and a User Plane Function (UPF), and a S1 control plane (NG-C) interface 115, which is a signaling interface between the BS 111 and Access and Mobility Management Functions (AMFs).

In aspects, where CN 120 is an evolved packet core (EPC) (referred to as "EPC 120" or the like), the RAN 110 can be CONNECTED with the CN 120 via the NG interface 113 that is an S1 interface. In aspects, the S1 interface can be split into two parts, an S1 user plane (S1-U) interface (e.g., in place of the NG-U interface 114), which carries traffic data between the BS 111 and the S-GW, and the S1-MME interface (e.g., in place of the S1 NG-C interface 115), which is a signaling interface between the BS 111 and MMEs.

The UE 101 can determine the UE capability and transmit the UE capability information to the BS by connections 102 or 104. The BS 111 can generate and transmit the RS to the UE 101 by connections 102 or 104 outside of a CBW of the UE. The UE 101 can measure the RS according to a channel comprising the RS. After receiving the RS, the UE can determine L1 measurement procedures to perform according to the air interface.

The RAN 110 is shown to be communicatively coupled to a core network—in this aspect, CN 120. The CN 120 can comprise a plurality of network components 122 (or network devices), which are configured to offer various data and telecommunication services to customers/subscribers (e.g., users of UEs 101) that are CONNECTED to the CN 120 via the RAN 110.

Layer-1 Reference Signaling Outside of Carrier Bandwidths

Figure 2:
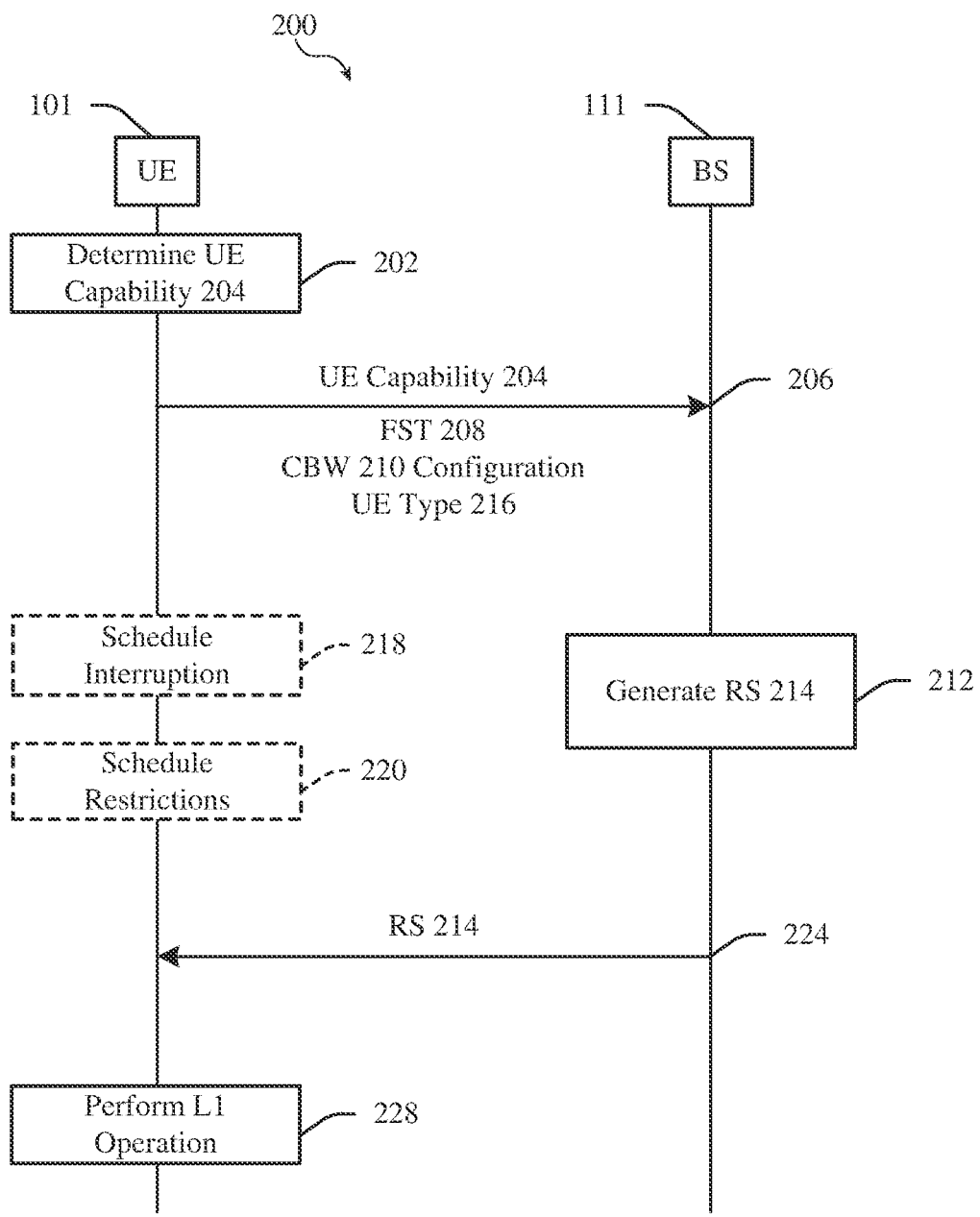
FIG. 2 illustrates a diagram of layer 1 (L1) reference signal (RS) signaling between a UE and a base station (BS) where the RS resides outside of a carrier bandwidth (CBW) of the UE.

FIG. 2 illustrates a diagram 200 of L1-RS signaling between a UE 101 and a BS 111 where the RS resides outside of a CBW 210 of the UE. In diagram 200, the UE 101 can be the UE 101a or UE 101b of FIG. 1. The BS 111 can be the BS 111a or the BS 111b of FIG. 1.

Downlink (DL) transmissions occur from the BS 111 to the UE 101 whereas uplink (UL) transmissions occur from the UE 101 to the BS 111. The downlink transmissions utilize a DL control channel and a DL data channel. The uplink transmissions utilize an Lk control channel and a UL data channel. The various channels can be different in terms of direction and link to another gNB, eNB, BS, APs, ANs, and the like.

The CBW 210 (also referred to as carrier bandwidth part), can be a contiguous set of resource blocks or physical resource blocks that are selected from a contiguous subset of one or more common resource blocks for a numerology of a carrier. The CBW 210 can include one or more bandwidth parts (BWPs), and the UE 101 can receive downlink (DL) signaling or transmit uplink (UL) signaling by the one or more BWPs of the CBW 210. In some examples, an active BWP or an active CBW may be configured by the BS 111 through, for example, RRC signaling.

Figure 3A:
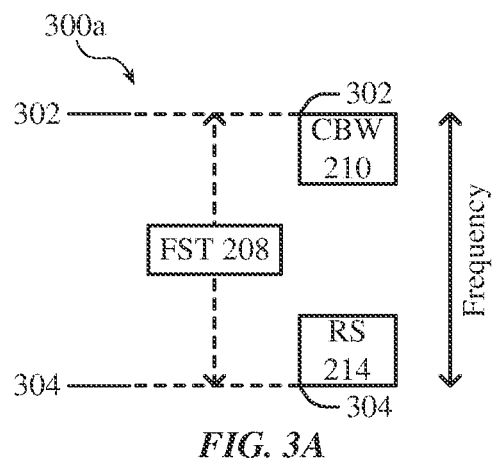
FIGS. 3A, 3B, and 3C illustrate a first frequency separation threshold (FST) configuration, a second FST configuration, and a third FST configuration respectively.
Figure 3B:
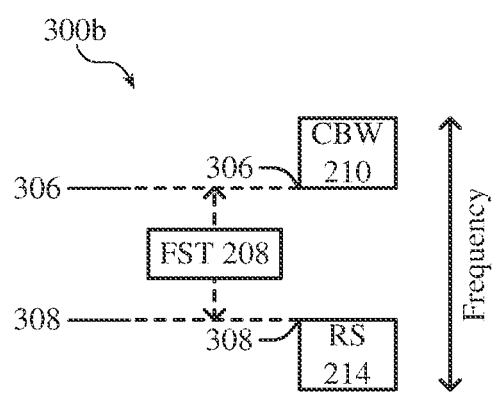
Figure 3C:
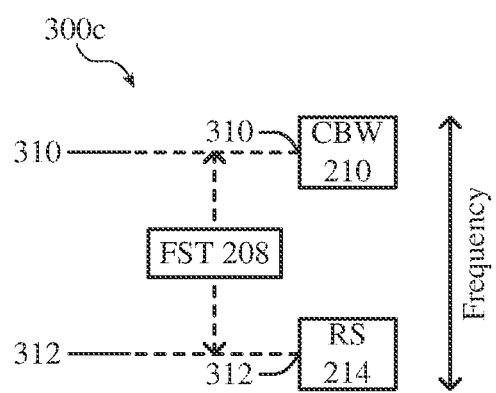

At 202 the UE 101 can determine a UE capability 204 associated with the UE 101 bandwidth capability including the CBW 210 of the UE 101. The UE capability 204 can include one or more of an indication of support for out-of-CBW 210 reception of RS 214, a frequency separation threshold (FST) 208, a bandwidth configuration of the UE 101, and a UE type 216. The FST 208 represents a frequency separation from the CBW 210 where the UE 101 can receive the RS 214 within a configurable bandwidth (BW) of the UE 101. The configurable BW is a supported instantaneous bandwidth of the UE 101. The FST 208 represents the frequency separation between the CBW 210 and where the RS 214 can reside outside of the CBW 210 and within the configurable BW of the UE. The configurable BW is discussed further in accordance with FIGS. 4A, 4B, and 4C. The FST 208 indicates where in frequency, relative to and outside of the CBW 210, the UE 101 is capable of receiving the RS 214. In some aspects, the FST 208 is a maximum separation from the CBW 210 where the RS 214 can reside within a maximum supported instantaneous BW of the UE. In other aspects, the FST 208 is not a maximum separation between the CBW 210 and RS 214 as supported by the UE 101, but rather the FST 208 is a subset of the maximum separation supported by the UE 101. As such, the FST 208 is configurable by the UE 101 based on the determined capability of the UE 101. FIGS. 3A-3C illustrate FST configurations indicating a relationship between the FST 208, CBW 210, and RS 214.

Now referring to FIG. 2 and FIGS. 3A, 3B, and 3C concurrently. FIG. 3A illustrates a first FST configuration 300a showing the RS 214 separated in frequency from the CBW 210 of the UE 101. The first FST configuration 300a shows the FST 208 defined between furthest band edges of the CBW 210 and the RS 214. Thus the FST 208 is defined at a furthest CBW band edge 302 and extends to a furthest RS band edge 304. As such, the FST 208 includes a frequency band that overlaps with both band edges of the CBW 210 and both band edges of the RS 214. In other words, the first FST configuration 300a provides UE capability information where the BS 111 configures, and the UE 101 receives the RS 214 outside of the CBW 210 where the furthest RS band edge 304 is separated from the furthest CBW band edge 302 by the FST 208.

FIG. 3B illustrates a second FST configuration 300b showing the FST 208 defined between neighboring band edges of the CBW 210 and the RS 214. Thus the FST 208 is defined at a neighboring CBW band edge 306 and extends to a neighboring RS band edge 308. The FST 208 does not extend to overlap with the CBW 210 or the RS 214 beyond the band edges of the CBW 210 and the RS 214. In other words, the second FST configuration 300b provides UE capability information where the BS 111 configures, and the UE 101 receives the RS 214 outside of the CBW 210 where the neighboring RS band edge 308 is separated from the neighboring CBW band edge 306 by the FST 208.

FIG. 3C illustrates a third FST configuration 300c showing the FST 208 defined between a center frequency of the CBW 210 and a center frequency of the RS 214. In this example, the FST 208 overlaps with half of the CBW 210, half of a bandwidth of the RS 214, and neighboring band edges of the CBW 210 and the RS 214. Thus the FST 208 is defined at a center CBW frequency 310 and extends to a center RS frequency 312. As such, the FST 208 overlaps with closest neighboring halves of the CBW 210 and the RS 214. In other words, the third FST configuration 300c provides UE capability information where the BS 111 configures, and the UE 101 receives the RS 214 outside of the CBW 210 where the center RS frequency 312 is separated from the center CBW frequency 310 by the FST 208.

The FST 208 configuration (e.g., the first FST configuration 300a, the second FST configuration 300b, or the third FST configuration 300c) provides different options for the UE 101 to calculate the FST 208. The FST 208 configuration allows flexibility for the UE 101 and the BS 111 to correlate transmission and reception of the RS 214 according to the supported FST 208 configuration determined by the UE 101 at 202.

Figure 4A:
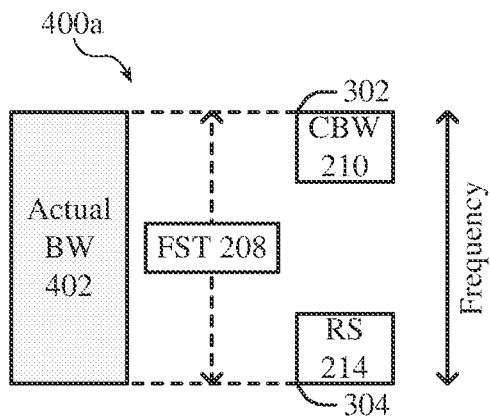
FIGS. 4A, 4B, 4C, 5A, 5B, 5C, 6A, 6B, and 6C illustrate UE types that associate an actual bandwidth (BW) of the UE with the FST, CBW, and RS.
Figure 4B:
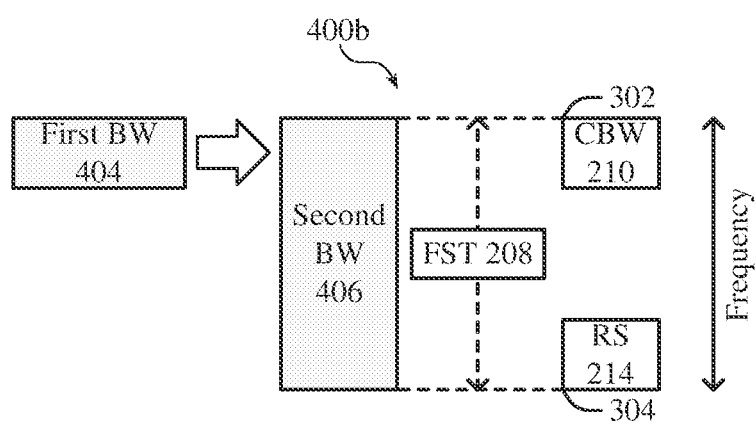
Figure 4C:
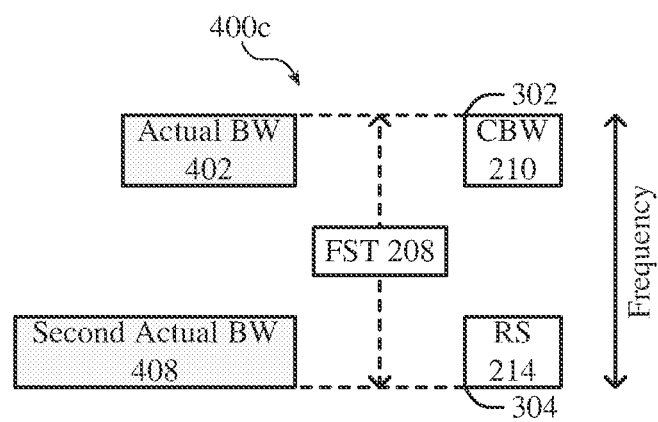

The UE capability 204 information can further indicate the UE type 216. The UE type 216 is a relationship between a configuration of the actual BW 402 of the UE 101 the configurable BW of the UE 101, and the FST 208. The actual BW 402 of the UE is the configured BW of the UE. In other words, the UE type 216 is a UE 101 implementation of its configurable BW (e.g., actual BW 402) to receive the RS 214 outside of the CBW 210. FIGS. 4A-4C illustrate options for the UE type 216 that can be supported by the UE 101. FIGS. 4A-4C describe the UE type 216 in the context of the first FST configuration 300a. It is understood that the discussion for FIGS. 4A-4C can also be implement in the context of the second FST configuration 300b and the third FST configuration 300c and are discussed as alternative examples in accordance to FIGS. 5A-5C and FIGS. 6A-6C respectively.

Now referring to FIG. 2 and FIGS. 4A-4C, 5A-5C, 6A-6C concurrently. FIG. 4A illustrates a first UE type 400a where the actual BW 402 of the UE 101 overlaps with furthest band edges of the FST 208, the CBW 210, and RS 214. The actual BW 402 of the UE 101 is a continuous instantaneous bandwidth supported by the UE for UL or DL signaling. According to the first UE type 400a, the CBW 210 is a subset of the actual BW 402, and the actual BW 402 extends wider than the CBW 210 to overlap with the RS 214. For example, the UE has a configurable BW of X (e.g., 100 MHz), the FST 208 can be the first FST configuration 300a defined by Y which is less than or equal to X, and the UE 101 configures the actual BW 402 as Z equal to Y (e.g., 60 MHz). The CBW 210 can have a BW of A (e.g., 20 MHz), and the RS 214 can have a BW of B (e.g., 10 MHz). The separation in frequency between inner band edges of the CBW 210 and the RS 214 (e.g., 30 MHz) would be Y minus the sum of A and B. As such, the UE 101 configures the actual BW 402 wider than the CBW 210 and receives the RS 214 within the actual BW 402. The FST 208 can be the maximum supported configurable BW of the UE 101 (e.g., X=100 MHz), or the FST 208 can be a subset of the maximum supported configurable BW of the UE 101 (e.g., Y=60 MHz), and is determined autonomously by the UE 101 based on the capability of the UE 101.

The first UE type 400a has the benefit of directly receiving the RS 214 at 224 at the cost of UE 101 resources by configuring and monitoring the actual BW 402 that is wider than the CBW 210 for time periods before and after receiving the RS 214.

Figure 5A:
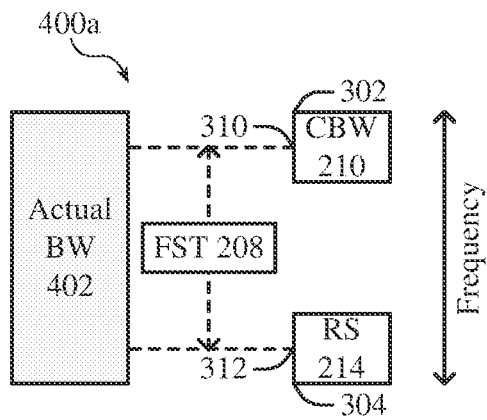

FIG. 5A shows the first UE type 400a implemented with the third FST configuration 300c of FIG. 3C. As in FIG. 4A, the actual BW 402 is configured between the furthest CBW band edge 302 and the furthest RS band edge 304. In FIG. 5A, the FST 208 is less than the actual BW 402 and is defined between the center frequency of the CBW 210 and the center frequency of the RS 214. In this aspect, the FST 208 is calculated based on the center CBW frequency 310 and the center RS frequency 312 and the actual BW 402 is calculated by the UE 101 based on the FST 208 and a known bandwidth of the CBW 210 and RS 214. For example, the UE has a configurable BW of X (e.g., 100 MHz), the FST 208 can be the third FST configuration 300c defined by Y (e.g., 45 MHz) which is less than X. The CBW 210 can have a BW of A (e.g., 20 MHz), and the RS 214 can have a BW of B (e.g., 10 MHz). The FST 208 is defined between the center CBW frequency 310 and the center RS frequency 312. The UE 101 can calculate the actual BW 402 as Z (e.g., 60 MHz) which is the sum of Y, half of A, and half of B. The separation in frequency between inner band edges of the CBW 210 and the RS 214 (e.g., 30 MHz) would be Y minus the sum of half of A and half of B. In this example, the actual BW 402 is the same as the example in FIG. 4A, with a difference in how the FST 208 is defined and subsequently how the actual BW 402 is calculated based on the FST 208.

As such, the RS 214 is configured by the BS 111 within the actual BW 402 of the UE according to the FST 208.

Figure 6A:
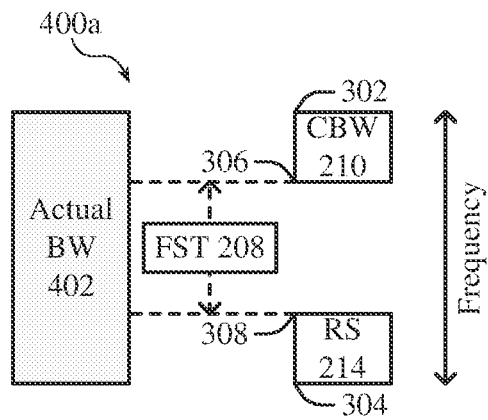
Figure 6B:
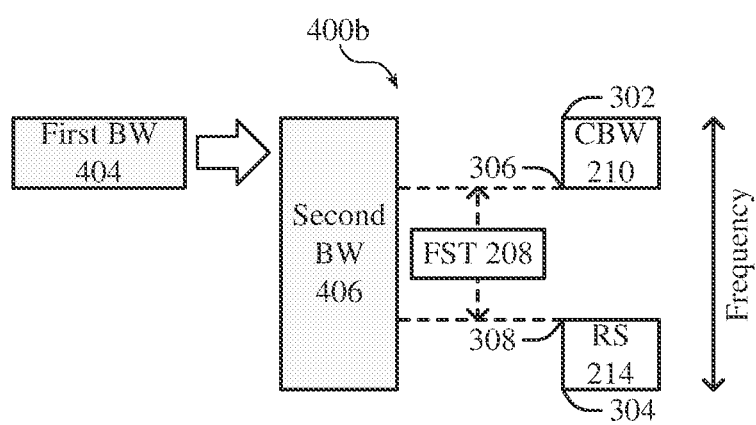
Figure 6C:
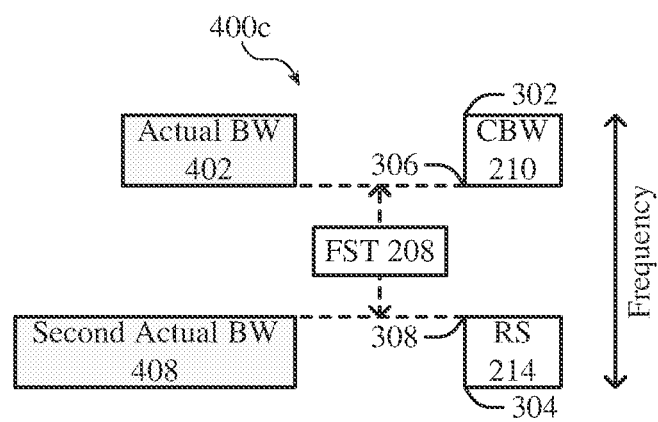

FIG. 6A shows the first UE type 400a implemented with the second FST configuration 300b of FIG. 3B. As in FIG. 4A, the actual BW 402 is configured between the furthest CBW band edge 302 and the furthest RS band edge 304. In FIG. 6A The FST 208 is less than the actual BW 402 and defined by nearest neighboring band edges of the CBW 210 and the RS 214 (e.g., neighboring CBW band edge 306 and neighboring RS band edge 308). In this aspect, the actual BW 402 is calculated by the UE 101 based on the FST 208 and the known bandwidth of the CBW 210 and the RS 214. For example, the UE 101 has a configurable BW of X (e.g., 100 MHz), the FST 208 can be the second FST configuration 300b defined by Y (e.g., 30 MHz) which is less than X and is the separation in frequency between inner band edges of the CBW 210 and the RS 214. The CBW 210 can have a BW of A (e.g., 20 MHz), and the RS 214 can have a BW of B (e.g., 10 MHz). The FST 208 is defined between the neighboring CBW band edge 306 and the neighboring RS band edge 308. The UE 101 can calculate the actual BW 402 as Z (e.g., 60 MHz) which is the sum of Y, A, and B. In this example, the actual BW 402 is the same as the examples in FIG. 4A and 5A, with a difference in how the FST 208 is defined and subsequently how the actual BW 402 is calculated based on the FST 208. As such, the RS 214 is configured by the BS 111 within the actual BW 402 of the UE according to the FST 208.

When the UE 101 implements the first UE type 400a, the RS 214 is received without scheduling interruptions at 218 before and after receiving the RS 214 because the actual BW 402 is configured to overlap with the RS 214 and the CBW 210. In some aspects (discussed further below), the UE 101 can schedule the interruption at 218 to accommodate a change in the actual BW 402 of the UE, or to configure a second actual BW 408 (e.g., FIGS. 4B and 4C).

In some aspects, implementation of the first UE type 400a includes a scheduling a restriction at 220. In some aspects, the restriction is scheduled at 220 to accommodate reception prioritization of the RS 214. Scheduling restrictions apply for frequency range-1 (FR1) when there is a conflict in subcarrier spacing (SCS) of the RS 214 and SCS of DL or UL signaling of the UE 101. When there is a conflict in SCS, the UE 101 may not have the capability to receive the RS 214 due to differing configurations of SCS, and a scheduling restriction on DL or UL signaling during reception of the RS 214 would apply. Scheduling restrictions apply for frequency range-2 (FR2) when there is a conflict in beam management associated with the RS 214. When there is a conflict in beam management, the UE 101 may not have the beam resources to simultaneously receive the RS 214 and conduct other DL or UL signaling, and a scheduling restriction on DL or UL signaling during reception of the RS 214 would apply.

When scheduling restrictions apply at 220, the UE 101 prioritizes reception of the RS 214 over one or more of UL signaling (e.g., a physical channel uplink transmission), DL signaling (e.g., a physical channel downlink reception), performing measurements, or receiving other RSs that are different than the RS 214. The physical channel uplink transmission may be a physical uplink control channel (PUCCH) transmission, a physical uplink shared channel (PUSCH) transmission, a sounding reference signal (SRS) or the like. The physical channel downlink reception may be a physical downlink control channel (PDCCH) reception, a physical downlink shared channel (PDSCH) reception, a tracking reference signal (TRS), a CSI-RS, or a channel quality indicator (CQI). Scheduling restrictions may apply according to the following examples for UE 101 operations in a frequency range-1 (FR1) or a frequency range-2 (FR2).

In a FR1 no scheduling restriction example, scheduling restrictions do not apply at 220 when there is not a conflict between the SCS of the RS 214 and UL or DL signaling. In this example, the RS 214 can be a SSB. The UE 101 can determine that the SCS of the RS 214 and a SCS of a PDCCH, a PDSCH, PUSCH, or PUCCH are the same, and no scheduling restrictions apply at 220. When the SCS between the RS 214 and UL or DL signaling are the same, the UE 101 has the capability to simultaneously perform UL or DL signaling and receive the RS 214 according the same SCS configuration across the actual BW 402. Because the SCS's are the same, the UE 101 does not have a SCS mismatch between the RS 214 and other UE 101 signaling, and can receive the RS 214 according to an existing SCS configuration of the UE 101. In another example, there is no conflict between the SCS of the RS and UL or DL signaling when the UE 101 supports simultaneous reception of data with different numerology (e.g., simultaneousRxDataSSB-DiffNumerology). The numerology is the SCS type used by the BS 111 or UE 101 for signaling or data, for example, the SCS type can be a subcarrier spacing of 15 kHz, 30 kHz, 60 kHz, or the like. When the UE 101 supports simultaneousRxDataSSB-DiffNumerology, the UE 101 supports UL or DL signaling according to a first SCS type (e.g., 15 kHz) and reception of the RS 214, which can be a SSB, according to a second SCS (e.g., 30 kHz) that is different than the first SCS. As such, the UE can support concurrent intra-frequency (e.g., actual BW 402) measurements on the RS 214 associated with a serving cell or a neighboring cell (via carrier aggregation) with a numerology that is different than a numerology of a PDCCH or PDSCH reception.

In a FR1 scheduling restriction example, scheduling restrictions at 220 apply when there is a conflict between the SCS of the RS and UL or DL signaling. In this example, the RS 214 can be a SSB. When the SCS of the RS 214 and the SCS of the UL or DL signaling are different, and the UE 101 does not support simultaneousRxDataSSB-DiffNumerology, the scheduling restriction at 220 is enabled. Scheduling restrictions apply in this example because the UE 101 can be configured according to the first SCS type (e.g., 15 kHz) for the actual BW 402, and the UE 101 does not have the capability to receive signaling according to a second SCS type (e.g., 30 kHz) of the RS 214 that is different from the first SCS type. As such, when the RS 214 is configured with the second SCS, the UE 101 cannot receive the RS 214 because the UE 101 is configured for a different SCS type and does not have the capability to support multiple simultaneous SCS types. When the scheduling restriction applies, the UE 101 can pause UL or DL signaling associated with the CBW 210, and configure the SCS associated with the RS 214 for the actual BW 402 to receive the RS 214.

In a FR2 no scheduling restriction example, scheduling restrictions do not apply at 220 when there is not a conflict in beam management associated with the RS 214. In this example, the RS 214 can be a CSI-RS. At frequencies associated with FR2, beamforming is employed for UL or DL signaling in different sub-bands. As the RS 214 is separated in frequency from the CBW 210, the UE 101 may configure multiple beams among sub-bands of the actual BW 402 to maintain CBW 210 operations and receive the RS 214. For example, the CBW 210 may be associated with a first beam, and the UE 101 may configure a second beam to receive the RS 214. Independent beam management (IBM) provides the UE 101 with the capability to configure multiple beams across the actual BW 402 where the UE 101 can maintain CBW 210 communications and receive the RS 214 in different beams. IBM enables the UE 101 to support inter-band or intra-band carrier aggregation with DL and UL beams for component carriers (CC) of a configured BW of the UE 101. Thus, with IBM enabled, the UE 101 can configure the first beam in the CBW 210, for example, associated with an active BWP of the CBW 210. The UE 101 can configure the second beam for the RS 214 where the second beam is offset in frequency relative to the CBW 210, and can be configured in a different direction relative to the first beam. As such, when IBM is configured, the UE 101 does not need to schedule a restriction at 220 to receive the RS 214 since the UE 101 can configure multiple beams for CBW 210 communications and RS 214 reception simultaneously.

Another example where there is not a conflict in beam management associated with the RS 214 is when the RS 214 is type-D quasi co-located (QCLed) with an active transmission control indicator (TCI) state for a PDCCH or a PDSCH reception, and where the CSI-RS is not in a CSI-RS resource set with repetition enabled. In this example, the RS 214 can be the CSI-RS. When the UE 101 has an active TCI state for a PDCCH or a PDSCH, and the RS 214 is type-D QCLed with the PDCCH or the PDSCH, the UE 101 can assume that the CSI-RS experienced similar channel conditions as the PDCCH or the PDSCH. As such, the CSI-RS is assumed to come from the same location with the same spatial receive parameters, same antenna array, and same spatial filter as the PDCCH or PDSCH. Since the UE 101 already configures a beam associated with the CBW 210 to receive the PDCCH or PDSCH, the UE 101 can use the same beam to receive the CSI-RS since the CSI-RS is QCLed with the PDCCH or PDSCH and shares the same spatial receive parameters. Furthermore, for scheduling restrictions to not apply, the CSI-RS is further not configured in a resource set with repetition enabled. When repetition is enabled for a CSI-RS resource set, the resource set is configured for receive beam tuning, optimization, or training. In this context, the UE 101 performs receive beam sweeping associated with the CSI-RS of the resource set to fine tune a best receive beam. Thus the CSI-RS in a resource set with repetitions enabled is suited for receive beam refinement, and the CSI-RS is not in a fixed beam for DL reception and thus not suited for scheduling restriction free operations.

In a FR2 scheduling restriction example, scheduling restrictions apply at 220 when there is a conflict in beam management associated with the RS 214. In this example, the RS 214 can be a CSI-RS. There can be a conflict in beam management associated with the RS 214 when the UE 101 cannot configure or correlate a beam to receive the RS 214. When the UE 101 determines it does not support IBM, the UE 101 cannot simultaneously configure different beams for the CBW 210 and the RS 214. As such, the UE 101 schedules the restriction at 220 to pause UL or DL signaling associated with the CBW 210 and configures a beam to receive the RS 214.

In another example, the UE 101 can determine that the CSI-RS is not type-D QCLed with an active TCI state for the PDCCH or the PDSCH reception, and IBM is not supported. In this example, the UE 101 cannot assume that the CSI-RS is spatially correlated with the PDCCH or the PDSCH associated with the CBW 210. As such, the UE 101 cannot assume that the CSI-RS is configured in an active beam of the UE 101, and the UE 101 determines the RS 214 cannot be received in the active beam. When the UE 101 determines the RS 214 is not configured in the active beam, the UE 101 schedules the restriction at 220, pauses UL or DL signaling, and configures a beam to receive the RS 214.

In another example, scheduling restrictions apply at 220 when the UE 101 determines no support for IBM, the CSI-RS is configured with repetitions enabled, and the CSI-RS is type-D QCLed with an active TCI state for the PDCCH or the PDSCH reception. While the UE 101 can use the active beam to receive the CSI-RS that is type-D QCLed with the PDCCH or the PDSCH, the UE 101 cannot receive the CSI-RS when the CSI-RS is in a resource set with enabled repetitions because the CSI-RS is transmitted in different beams to fine tune the best receive beam. Thus the CSI-RS is not transmitted in a fixed beam reliable for reception of the CSI-RS in the active beam. When the UE 101 determines the RS 214 (e.g., CSI-RS) is not configured in the active beam associated with the PDCCH or the PDSCH, the UE 101 schedules the restriction at 220, pauses UL or DL signaling, and configures a beam to receive the RS 214.

It is noted that when the scheduling restriction at 220 does not apply, the UE 101 can prioritize the RS 214 and one or more of a UL signaling (e.g., physical channel uplink transmission), a DL signaling (e.g., a physical channel downlink reception), performing measurements, or receiving other RSs according to a default prioritization.

FIG. 4B illustrates a second UE type 400b where the actual BW 402 of the UE 101 is the same as the first BW 404 which is equal to the CBW 210. The UE 101 can reconfigure the actual BW 402 from the first BW 404 to a second BW 406 that overlaps both band edges of the CBW 210 and the RS 214. As such, the UE 101 schedules the interrupt at 218 when configured with the second UE type 400b. The interrupt can be a first interrupt scheduled before reception of the RS 214 at 224 where the actual BW 402 is reconfigured from the first BW 404 to the second BW 406. The scheduled interrupt can also include a second interrupt scheduled after reception of the RS 214 at 224 where the actual BW 402 is reconfigured from the second BW 406 back to the first BW 404. As such, the UE 101 pauses UL or DL signaling during the configured interrupt (e.g., the first or second interrupt) and reception of the RS 214. In some aspects, the interrupt can be 0.5 milliseconds (ms) when the actual BW 402 is in FR1, and can be 0.25 ms when the actual BW 402 is in FR2. In addition to scheduling the interruption at 218, the UE 101 can schedule restrictions at 220 according to aspects described above. The second BW 406 can be configured based on the FST 208 as described in accordance with the actual BW 402 of FIG. 4A.

Figure 5B:
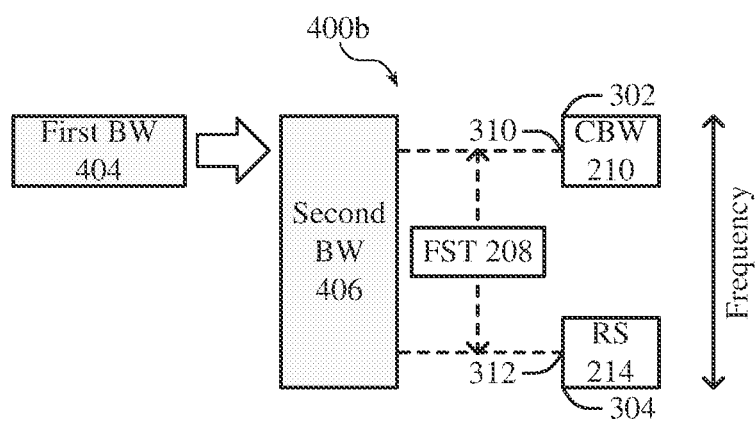

The second UE type 400b of FIG. 4B is shown with the first FST configuration 300a. Alternatively, the second UE type 400b can be implemented with the third FST configuration 300c as shown in FIG. 5B or the second FST configuration 300b of FIG. 6B. The second BW 406 of FIG. 5B can be configured based on the FST 208 as described in accordance with the actual BW 402 of FIG. 5A. The second BW 406 of FIG. 6B can be configured based on the FST 208 as described in accordance with the actual BW 402 of 6A.

When the UE 101 implements the second UE type 400b, the RS 214 is received with scheduling interruptions before and after receiving the RS 214 because the actual BW 402 is the first BW 404 which only overlaps with the CBW 210 before receiving the RS 214. The second UE type 400b conserves frequency resources by configuring a narrower actual BW 402 before and after receiving the RS 214 relative to the first UE type 400a which configures a wider actual BW 402 that overlaps both the CBW 210 and the RS 214 before and after receiving the RS 214. However, the second UE type 400b adds complexity in receiving the RS 214 relative to the first UE type 400a in scheduling the interrupts and reconfiguring the actual BW 402 between the first BW 404 and the second BW 406.

FIG. 4C illustrates a third UE type 400c where the actual BW 402 of the UE 101 is the same as the CBW 210 and the UE 101 configures a second actual BW 408 to receive the RS 214. In the third UE type 400c, the actual BW 402 is configured according to a first RF chain. The RS 214 resides outside of the actual BW 402, and the UE 101 can configure a second actual BW 408 that is different from the actual BW 402 according to a second RF chain. For example, the actual BW 402 can be for FR1 according to the first RF chain and the second actual BW 408 can be for FR2 according to the second RF chain where the second actual BW 408 is configured to overlap with the RS 214. As such, the UE 101 configures two simultaneous bandwidths, the actual BW 402 associated with the CBW 210, and the second actual BW 408 associated with the RS 214. The UE receives the RS 214 according to the second actual BW 408.

Since the UE 101 configures the second actual BW 408, the UE 101 schedules a first interrupt before receiving the RS 214 to provide time for the UE 101 to configure the second actual BW 408. The UE 101 schedules a second interrupt after receiving the RS 214 at 226 for the UE 101 to de-configure the second actual BW 408 and conserve resources. While the examples above associate the actual BW 402 with FR1 and the second actual BW 408 with FR2, the example is non-limiting, and the actual BW 402 can be associated with FR2 and the second actual BW 408 can be associated with FR1. The UE 101 can cease UL or DL signaling during the interrupt (e.g., the first or second interrupt). In some aspects, the interrupt can be 0.5 ms if the second actual BW 408 is for FR1. In alternative aspects, the interrupt can be 0.25 ms if the second actual BW 408 is for FR2.

Figure 5C:
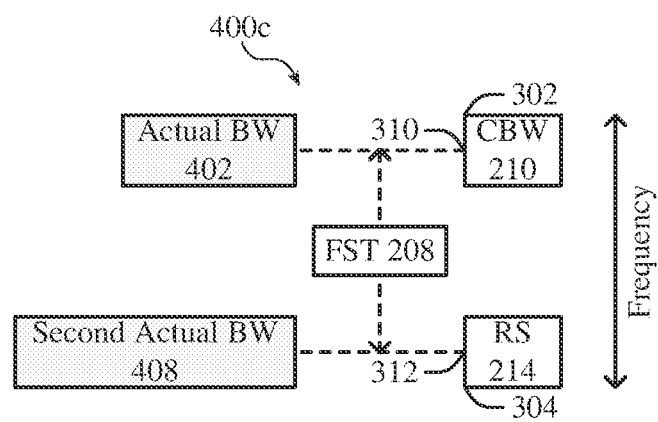

The third UE type 400c is shown with the first FST configuration 300a. Alternatively, the third UE type 400c can be implemented with the third FST configuration 300c as shown in FIG. 5C or the second FST configuration 300b of FIG. 6C. The third UE type 400c conserves UE 101 frequency resources by configuring an actual BW 402 that is narrow (e.g., narrow actual BW) that overlaps with the CBW 210 and receives the RS 214 by configuring a second actual BW 408. The third UE type 400c avoids scheduling restrictions because the actual BW 402 and the second actual BW 408 are configured with different RF chains. The second actual BW 408 can be configured with the SCS of the RS 214 and the actual BW 402 can be configured with the SCS of UL or DL signaling, by using two RF chains, the SCS on each chain can be different without causing a SCS conflict. Thus a SCS conflict is avoided between the SCS of the RS 214 and the SCS of UL or DL signaling in the CBW 210.

The UE type 216 can be one of the first UE type 400a, the second UE type 400b, or the third UE type 400c. The first UE type realizes simplified reception of the RS 214 relative to the second UE type 400b or the third UE type 400c at the cost of higher UE 101 frequency resource utilization. The higher UE 101 frequency resource utilization is due to the actual BW 402 being configured between the CBW 210 and RS 214 before and after reception of the RS 214 relative to the smaller BW of the actual BW 402 in the second UE type 400b and the third UE type 400c. The second UE type 400b and the third UE type 400c conserve frequency resources of the UE 101, outside of receiving the RS 214, at the cost of scheduling interruptions before and after receiving the RS 214. As such, the second UE type 400b and the third UE type 400c are more complex relative to the first UE type 400a due to configuring and de-configuring frequency resources of the UE 101 during the first and second interrupt. In summary, the first UE type 400a provides simplified UE 101 operation and higher power consumption do to the wider actual BW 402 configuration. The second UE type 400b and the third UE type 400c provide power savings due to smaller BW configurations with more complicated UE 101 operations relative to the first UE type 400a.

In addition to aspects described above, the UE capability 204 can indicate further features associated with the FST 208. The FST 208 can be configured and communicated on a per UE basis. As such, the FST 208 can be unique according to a particular UE, such as UE 101, or the FST 208 can be common amongst a group of UEs within cell coverage of BS 111. In other aspects, the FST 208 can be specific to a particular frequency range of UE 101. As such, the UE 101 may generate and transmit a plurality of FST to the BS 111 where the plurality of FST relate to a plurality of frequency bands or frequency ranges. For example, the UE 101 may generate and transmit a first FST associated with FR1, and a second FST associated with FR2. The UE 101 can generate a plurality of FST based on band combinations. As such, the FST 208 can be defined based on a per frequency range basis, a per frequency band basis, or a per frequency band and frequency band combination basis. In other aspects, the FST 208 can be determined based on a configured component carrier or based on a carrier aggregation configuration according to a subcarrier spacing or a bandwidth class. In additional or alternative aspects, the FST 208 can be defined based on a received configuration of a carrier bandwidth.

At 206, the UE 101 transmits the UE capability 204 to the BS 111. The UE capability 204 can be transmitted to the BS 111 according to RRC signaling. For example, the UE 101 may transmit the UE capability 204 to the BS 111 during a RRC connect procedure. The BS 111 can generate the RS 214 at 212 according to the UE capability 204 including the FST 208, the UE type 216, and the CBW 210 configuration. At 224, the BS 111 transmits the RS 214 to the UE 101. In some aspects, the BS 111 transmits the RS 214 according to a periodicity. The BS 111 can determine the periodicity and signal the periodicity to the UE 101, for example, in a RRC configuration. As such, the UE 101 can receive the RS 214 based on the known periodicity as indicated by the BS 111.

After the UE 101 receives the RS 214, the UE 101 can perform a L1 operation at 228 associated with the RS 214. The L1 operation can include one or more of a BM, RLM, or BFD operation. As such, the RS 214 can be referred to as a L1-RS.

Figure 7:
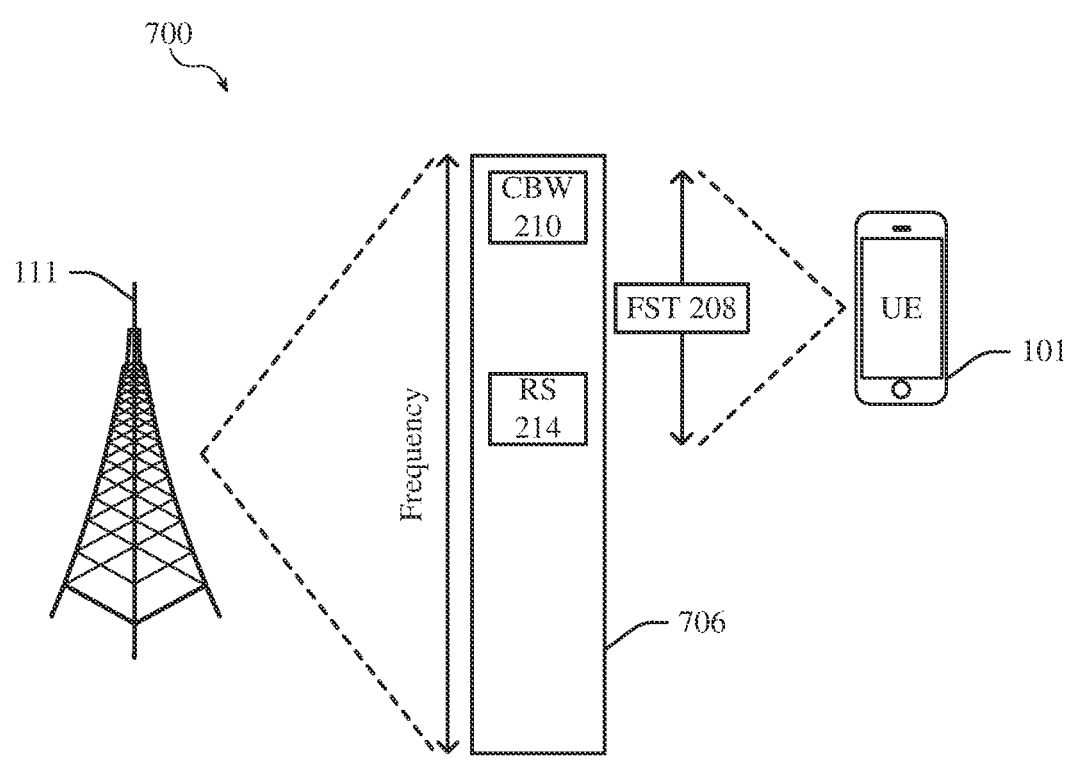
FIG. 7 illustrates a diagram of a communication network between a BS and a UE that implements the signaling of FIG. 2.

FIG. 7 illustrates a diagram of a communication network 700 between a BS 111 and a UE 101 that implements the signaling of FIG. 2. The BS 111 has a BS BW 706 that is larger than a BW of the UE (e.g., actual BW 402, first BW 404, second BW 406, or second actual BW 408 of FIGS. 4A, 4B, or 4C). The CBW 210 of the UE 101 resides within the BS BW 706. The RS 214 is transmitted by the BS 111 within the BS BW 706 and according to the FST 208 based on the UE capability 204. The RS 214 is transmitted in a configured BW of the UE (e.g., actual BW 402, second BW 406, or second actual BW 408 of FIGS. 4A, 4B, or 4C). Communication network 700 shows RS 214 transmitted according to the FST 208 and within a configurable BW of the UE 101. In other aspects, the RS 214 is transmitted outside of FST 208, or in the BS BW 706 unassociated with the FST 208 described in further details in accordance with other aspects herein. FIG. 7 is illustrated with the first FST configuration 300a of FIG. 3A. It is understood that this example is non-limiting, and the communication network 700 can be configured with the second FST configuration 300b, or the third FST configuration 300c of FIG. 3B and 3C respectively.

Aspects described in accordance with FIGS. 2-7 provide mechanisms for a UE 101 to receive a RS 214 outside of a CBW 210 and based on the FST 208.

Figure 8:
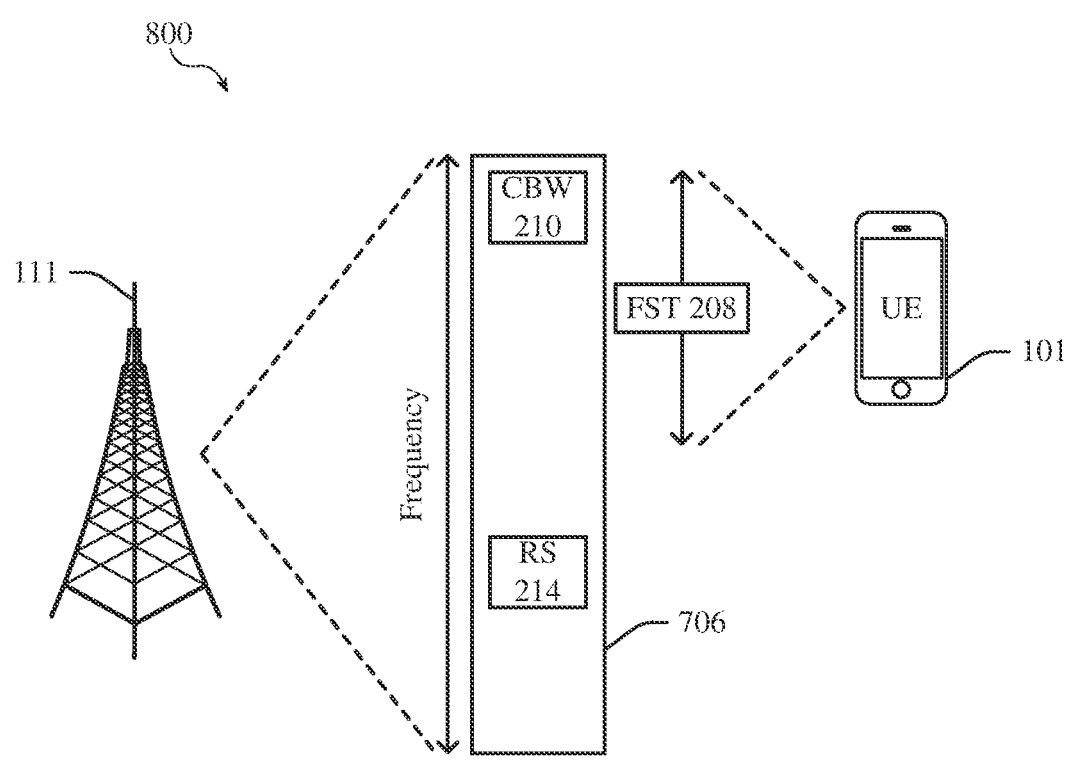
FIG. 8 illustrates a diagram of a communication network between a BS and a UE where the RS resides outside of the FST.

FIG. 8 illustrates a diagram of a communication network 800 between a BS 111 and a UE 101 where the RS 214 resides outside of the FST 208. The BS 111 has a BS BW 706 that is larger than a BW of the UE (e.g., actual BW 402, first BW 404, second BW 406, or second actual BW 408 of FIGS. 4A, 4B, or 4C). The CBW 210 of the UE 101 resides within the BS BW 706. The RS 214 is transmitted by the BS 111 within the BS BW 706 and outside of the FST 208, or outside of a configurable instantaneous BW of the UE 101 that can overlap with both the CBW 210 and the RS 214. As such, the RS 214 is transmitted in the BS BW 706 and unassociated with the FST 208. The UE 101 may not be able to receive the RS 214 in an actual BW of the UE 101 because the RS 214 is transmitted outside of an instantaneous BW of the UE 101 that overlaps with the CBW 210 and the RS 214. In this aspect, the BS 111 can configure the UE with a measurement gap so that the UE 101 can reconfigure the actual BW 402 of the UE 101 and measure the RS 214. FIG. 8 is illustrated with the first FST configuration 300a of FIG. 3A. It is understood that this example is non-limiting, and the communication network 800 can be configured with the second FST configuration 300b, or the third FST configuration 300c of FIGS. 3B and 3C respectively.

Figure 9:
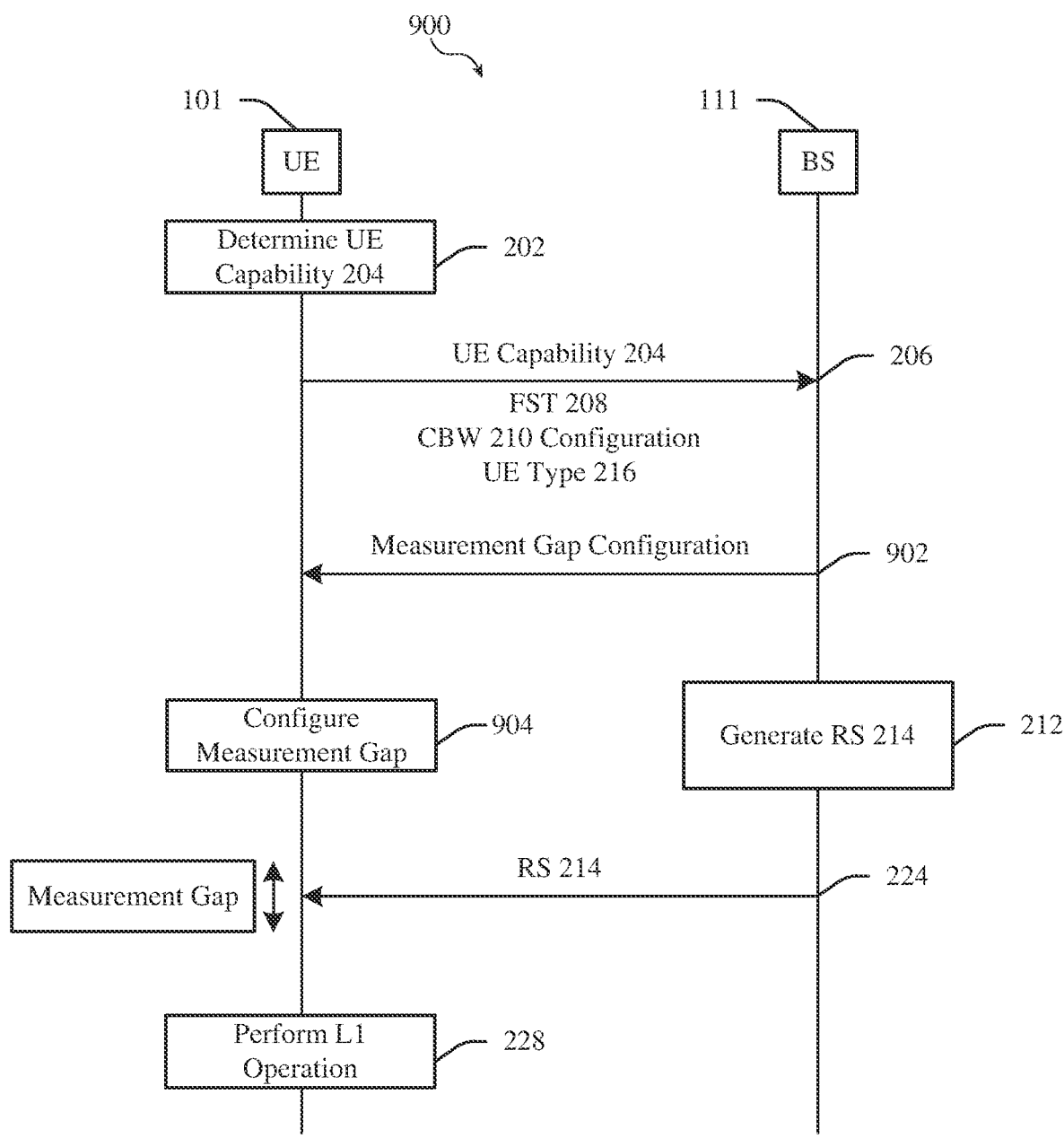
FIG. 9 illustrates a diagram of L1-RS signaling between a UE and a BS where the RS resides outside of a CBW of the UE and outside of the FST.

FIG. 9 illustrates a diagram 900 of L1-RS signaling between a UE 101 and a BS 111 where the RS resides outside of a CBW 210 of the UE 101 and outside of the FST 208. In diagram 900, the UE 101 can be the UE 101a or UE 101b of FIG. 1. The BS 111 can be the BS 111a or the BS 111b of FIG. 1. Diagram 900 shows similar features relative to diagram 200 with alternative features shown in the measurement gap transmitted by the BS 111 at 902 and the UE 101 configuring the measurement gap at 904.

The BS 111 can transmit a configuration of a measurement gap associated with the RS 214 to the UE at 902. Event 902 can occur any time before the BS transmits the RS 214 at 224. As such, the BS 111 can transmit the configuration of the measurement gap before or after events 202 or 206. The configuration of the measurement gap can be transmitted by the BS 111 and received by the UE 101 through RRC signaling. In some examples, the measurement gap can be configured using a measurement gap information element (MeasGapConfig IE) in a RRC reconfiguration message. The measurement gap configuration can further indicate a measurement gap for FR1 or FR2 and can include an indication of the frequency band the RS 214 will be transmitted in.

After receiving the measurement gap, the UE 101 configures the measurement gap at 904. The UE 101 configures the measurement gap to occur at 224 while receiving the RS 214. At 224 the BS 111 transmits the RS 214 during the measurement gap. During the measurement gap, the UE 101 may be configured not to transmit data and/or reference signals in an uplink channel and/or receive data and/or reference signals in a downlink channel that are not the RS 214. Additionally, during the measurement gap, the UE 101 reconfigures the actual BW 402 to overlap with the RS 214, and after receiving the RS 214, the UE 101 configures the actual BW 402 to overlap with the CBW 210. When the UE 101 reconfigures the actual BW 402 to overlap with the RS 214, the actual BW 402 may no longer overlap with the CBW 210. In this aspect, before the measurement gap at 224, the actual BW 402 may correspond to one of FIGS. 4A, 4B, and 4C, where the actual BW 402 is associated with the FST 208 and the CBW 210. Because the CBW 210 resides outside of the FST 208, and separated from band edges of the FST 208, the UE 101 reconfigures the actual BW 402 to the BW of the RS 214 during the measurement gap.

In diagram 900, the UE 101 receives the RS 214 at 224 according to the measurement gap and the UE 101 does not need to configure the interruption corresponding to 218 of FIG. 2 or configure restrictions corresponding to 220 of FIG. 2. Furthermore, aspects described herein in relation to the figures describe the UE 101 receiving the RS 214 at 224. Receiving the RS 214 at 224 is analogous to measuring the RS 214 at 224. Furthermore, receiving the RS 214 at 224 can be described as performing a L1 measurement operation on the RS 214 at 224.

Figure 10:
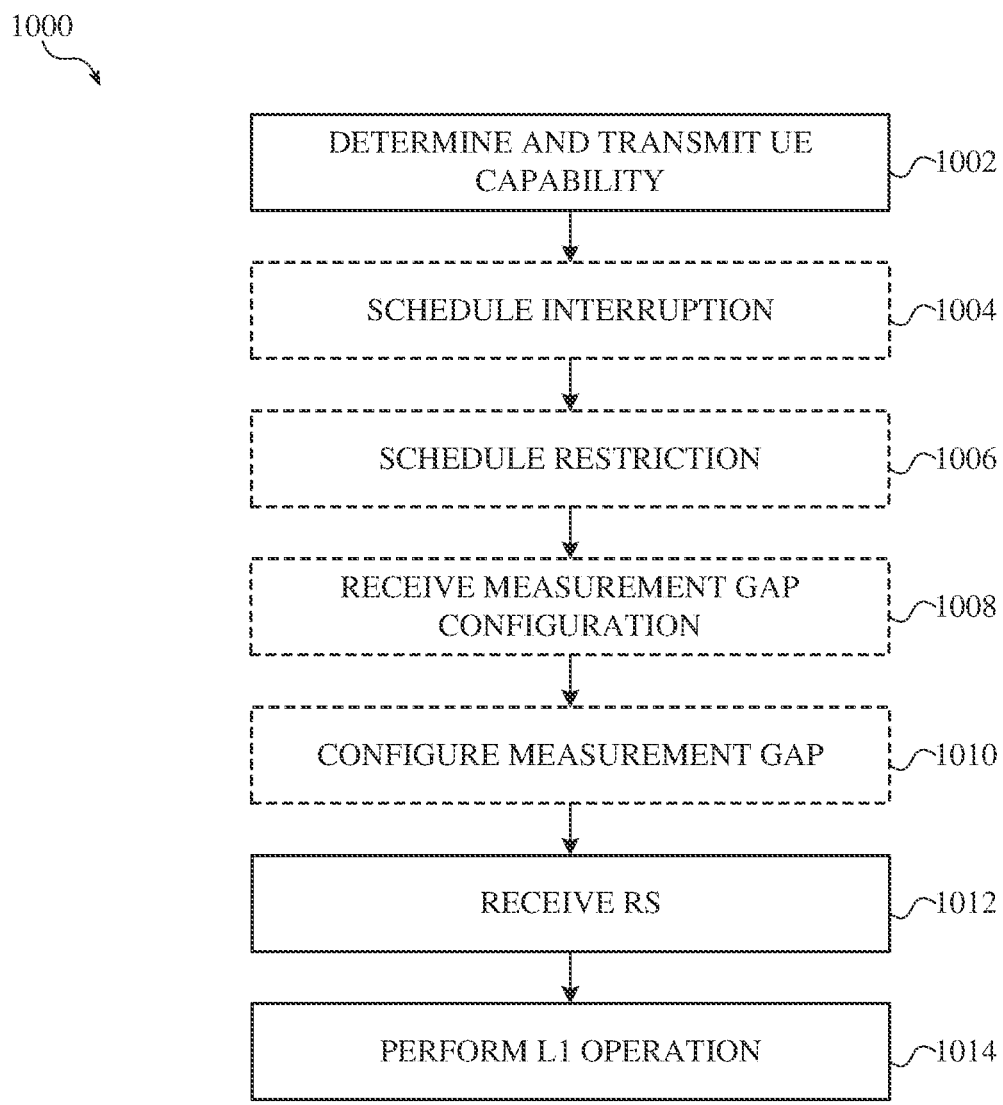
FIG. 10 illustrates a flow diagram of an example method by which the UE receives a RS outside of a CBW of the UE.

FIG. 10 illustrates a flow diagram of an example method 1000 by which the UE receives a RS outside of a CBW of the UE. The example method 1000 may be performed, for example, by the UE 101 of FIG. 1.

At 1002, the method includes determining a UE capability and transmitting the UE capability. The UE capability can include an indication of support for out of CBW reception for a RS, a FST, a BW configuration of the UE, and a UE type. The RS is associated with a L1 measurement operation. The FST can represent a frequency separation from the CBW, for example, a frequency separation between the CBW and the RS, where the RS resides outside of the CBW. The UE type can indicate a relationship between the CBW and an actual BW of the UE. FIGS. 2 and 9 at 202 and 206, and FIGS. 3A-3C, and FIGS. 4A-4C, 5A-5C, and 6A-6C correspond to some aspects of act 1002.

At 1004, the method includes optionally configuring an interruption. The interruption can be scheduled according to the UE type such that the UE can reconfigure the actual BW of the UE, or configure a second actual BW of the UE to receive the RS. The UE can reconfigure the actual BW from a first BW that overlaps with the CBW but does not overlap with the RS to a second BW that overlaps with both the CBW and the RS. Alternatively, the actual BW may overlap with the CBW and not overlap with the RS, and the actual BW is configured according to a first RF chain associated with a frequency band (e.g., FR1). The UE can configure the second actual BW according to a different frequency band (e.g., FR2) that overlaps with the RS, and receive the RS according to the second actual BW. FIG. 2 at 218 and FIGS. 4B, 4C, 5B, 5C, 6B, and 6C correspond to some aspects of act 1004.

At 1006, the method optionally includes scheduling a restriction to accommodate reception prioritization of the RS. Scheduling restrictions may result in prioritizing the RS over one or more of a physical channel uplink transmission, a physical channel downlink reception, performing measurements, or receiving other RSs based on criteria or conditions associated with a SCS of the RS, UE capability, or the like. FIG. 2 at 220 corresponds to some aspects of act 1006.

At 1008, the method optionally includes receiving a measurement gap configuration. In some aspects, the RS may reside outside of the CBW of the UE and reside outside of the FST, and a measurement gap can provide a time period for the UE to reconfigure the actual BW to overlap with the RS. FIG. 10 and FIG. 9 at 902 correspond to some aspects of act 1008.

At 1010, the method optionally includes configuring the measurement gap based on the measurement gap configuration at 1008, where the actual bandwidth is reconfigured to receive the RS. FIG. 10 and FIG. 9 at 904 correspond to some aspects of act 1010.

At 1012, the method includes receiving the RS outside of the configured CBW of the UE. The RS can be received during the optional measurement gap of acts 1006 and 1008, or received during the optional scheduled restriction at act 1006. In some aspects, receiving the RS is described as measuring the RS according to a L1 measurement operation. FIG. 2 at 224, FIG. 7, FIG. 8, and FIG. 9 at 224 correspond to some aspects of act 1012.

At 1014, the method includes performing a L1 operation based on the received RS. The L1 operation can include performing one or more of beam monitoring, radio link monitoring, or beam failure detection and recovery. As such, the RS is associated with beam monitoring, radio link monitoring, or beam failure detection and recovery. FIGS. 2 and 9 at 228 correspond to some aspects of act 1014.

Figure 11:
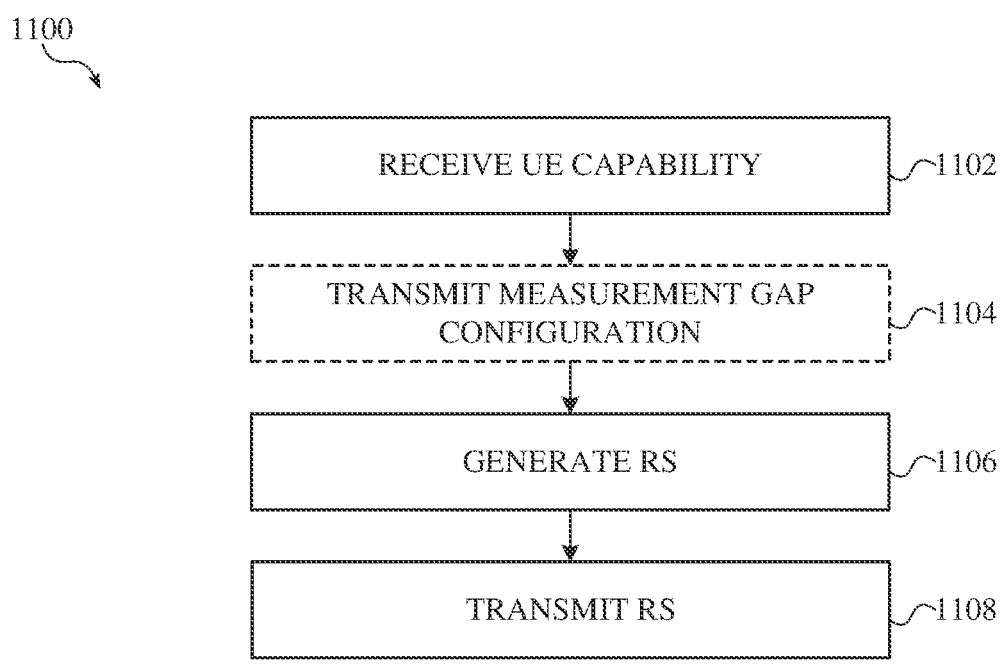
FIG. 11 illustrates a flow diagram of an example method by which a BS transmits a RS outside of a CBW of the UE.

FIG. 11 illustrates a flow diagram of an example method 1100 by which a BS transmits a RS outside of a CBW of a UE. The example method 1100 may be performed, for example, by the BS 111 of FIG. 1

At 1102, the method includes receiving a UE capability. The UE capability can include an indication of support for out of CBW reception for a RS, a FST, a BW configuration of the UE, and a UE type. The RS is associated with a L1 measurement operation. The FST can represent a frequency separation from the CBW, for example, a frequency separation between the CBW and the RS, where the RS resides outside of the CBW. The UE type can indicate a relationship between the CBW and an actual BW of the UE. FIGS. 2 and 9 at 206, and FIGS. 3A-3C, and FIGS. 4A-4C, 5A-5C, and 6A-6C correspond to some aspects of act 1102.

At 1104, the method optionally includes transmitting a measurement gap configuration. In some aspects, the RS may reside outside of the CBW of the UE and reside outside of the FST, and a measurement gap can provide a time period for the UE to reconfigure the actual BW to overlap with the RS. As such, the method includes generating a measurement gap configuration for the UE to use when receiving the RS. FIG. 10 and FIG. 9 at 902 correspond to some aspects of act 1104.

At 1106, the method includes generating the RS outside of the CBW of the UE indicated by the UE capability. The RS can be generated according to a UE type and based on a FST as indicated in the UE capability. FIG. 2 at 224, FIG. 7, FIG. 8, and FIG. 9 at 224 correspond to some aspects of act 1012.

At 1108, the method includes transmitting the RS outside of the CBW of the UE indicated by the UE capability or configured by the BS 111. The RS can be transmitted during the optional measurement gap of act 1104. FIG. 2 at 224, FIG. 7, FIG. 8, and FIG. 9 at 224 correspond to some aspects of act 1012.

Figure 12:
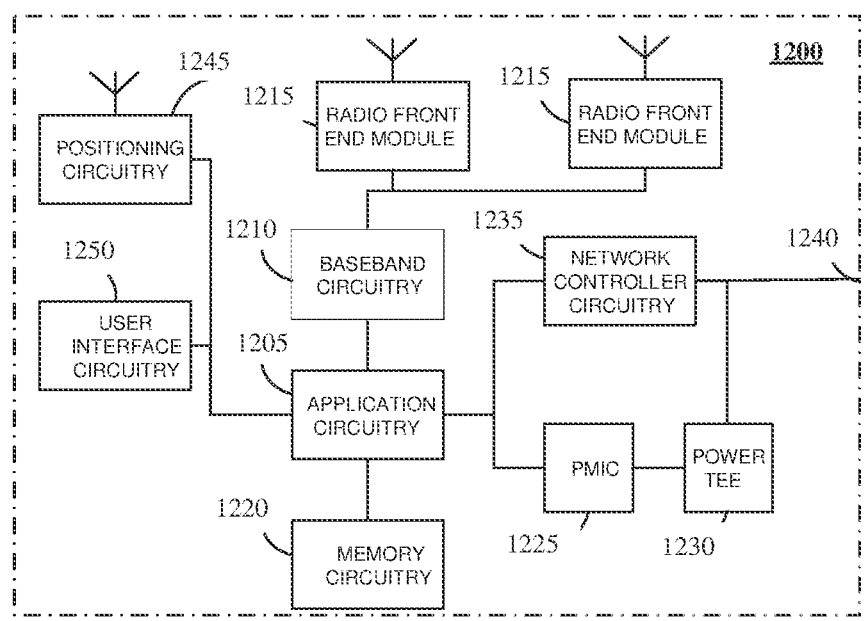
FIG. 12 illustrates an example of an infrastructure equipment, in accordance with various aspects disclosed.

FIG. 12 illustrates an example of a system 1200 in accordance with various aspects. The system 1200 (or "infrastructure equipment") may be implemented as a base station, radio head, RAN node such as the BS 111 of FIG. 1 and/or any other element/component/device discussed herein. In other examples, the system 1200 could be implemented in or by a UE such as UE 101 of FIG. 1. In yet other aspects, some features of the system 1200 could be implemented in or by the BS 111a (e.g., first BS) or the BS 111b (e.g., second BS) of FIG. 12.

The system 1200 includes application circuitry 1205, baseband circuitry 1210, one or more radio front end modules (RFEMs) 1215, memory circuitry 1220 (including a memory interface), power management integrated circuitry (PMIC) 1225, power tee circuitry 1230, network controller circuitry 1235, network interface connector 1240, satellite positioning circuitry 1245, and user interface 1250. In some aspects, the device of system 1200 may include additional elements/components/devices such as, for example, memory/storage, display, camera, sensor, or input/output (I/O) interface. In other aspects, the components/devices described below may be included in more than one device. For example, said circuitries may be separately included in more than one device for CRAN, vBBU, or other like implementations.

The baseband circuitry 1210 can be used to determine the UE capability 204, schedule the interruption, schedule the restriction, configure the measurement gap, or perform the L1 operation by the UE 101 as described herein. Furthermore, the baseband circuitry 1210 can be used to transmit the UE capability 204, or receive the measurement gap configuration, or receive the RS 214 by the UE 101 as described herein. The baseband circuitry 1210 can be used to receive the UE capability 204, generate the RS 214, transmit the measurement gap, or transmit the RS 214 for the BS 111

Application circuitry 1205 includes circuitry such as, but not limited to one or more processors (or processor cores), processing circuitry, cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1205 may be coupled with or may include memory/storage elements/components/devices and may be configured to execute instructions stored in the memory/storage to enable various applications or operating systems to run on the system 1200. In some implementations, the memory/storage elements/components/devices may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1205 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some aspects, the application circuitry 1205 may comprise, or may be, a special-purpose processor/controller to operate according to the various aspects herein. As examples, the processor(s) of application circuitry 1205 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some aspects, the system 1200 may not utilize application circuitry 1205, and instead may include a special-purpose processor/controller to process IP data received from an EPC or 5GC, for example.

User interface 1250 may include one or more user interfaces designed to enable user interaction with the system 1200 or peripheral component or device interfaces designed to enable peripheral component or device interaction with the system 1200. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component or device interfaces may include, but are not limited to, a nonvolatile memory port, a universal serial bus (USB) port, an audio jack, a power supply interface, etc.

The components or devices shown by FIG. 12 may communicate with one another using interface circuitry, that is communicatively coupled to one another, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 13:
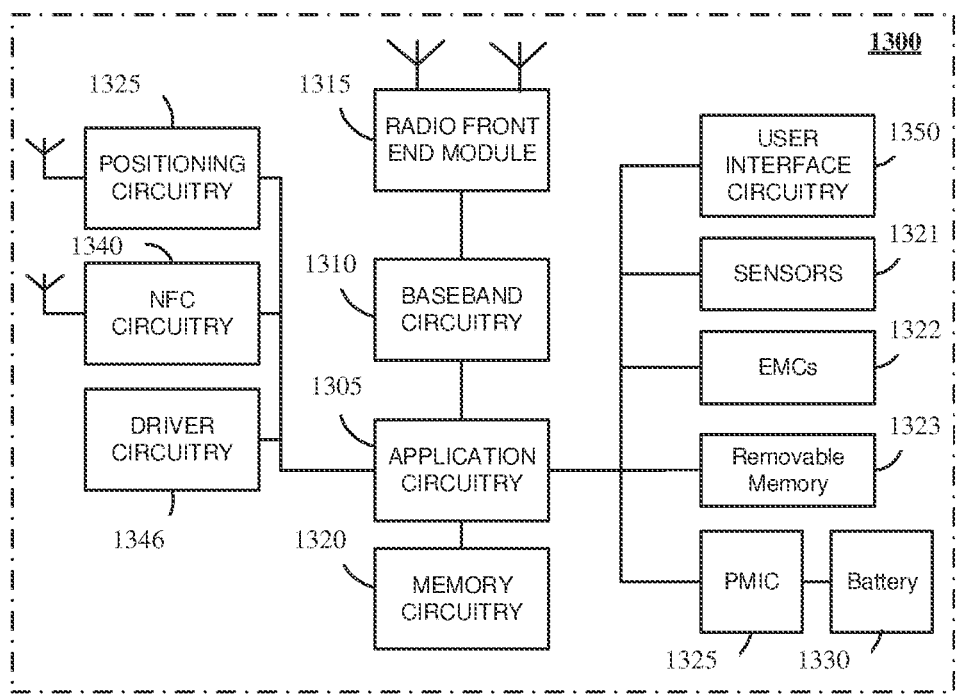
FIG. 13 illustrates an example of a UE or BS platform, in accordance with various aspects disclosed.

FIG. 13 illustrates an example of a platform 1300 (or "device 1300") in accordance with various aspects. In aspects, the platform 1300 may be suitable for use as the UE 101 of FIG. 1, and/or any other element/component/device discussed herein such as the BS 111, BS 111*a* (e.g., first BS), or BS 111*b* (e.g., second BS. The platform 1300 may include any combinations of the components or devices shown in the example. The components or devices of platform 1300 may be implemented as integrated circuits (ICs), portions thereof, discrete electronic devices, or other modules, logic, hardware, software, firmware, or a combination thereof adapted in the platform 1300, or as components or devices otherwise incorporated within a chassis of a larger system. The block diagram of FIG. 13 is intended to show a high level view of components or devices of the platform 1300. However, some of the components or devices shown may be omitted, additional components or devices may be present, and different arrangement of the components or devices shown may occur in other implementations.

Application circuitry 1305 includes circuitry such as, but not limited to one or more processors (or processor cores), memory circuitry 1320 (which includes a memory interface), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1305 may be coupled with or may include memory/storage elements/component/device and may be configured to execute instructions stored in the memory/storage to enable various applications or operating systems to run on the system platform 1300. In some implementations, the memory/storage elements/components/devices may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The memory circuitry 1320 can be used to store the UE capability 204 by the UE 101 or the BS 111. The memory circuitry 1320 can further store instructions to schedule an interruption, schedule a restriction, perform a L1 operation, or a configuration for a gap measurement for a UE 101. The memory circuitry 1320 can further store instructions to generate the RS 214 or generate a measurement gap for a BS 111.

As examples, the processor(s) of application circuitry 1305 may include a general or special purpose processor, such as an A-series processor (e.g., the A13 Bionic), available from Apple® Inc., Cupertino, CA or any other such processor. The processors of the application circuitry 1305 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-ft and Cortex-M family of processors; or the like. In some implementations, the application circuitry 1305 may be a part of a system on a chip (SoC) in which the application circuitry 1305 and other components or devices are formed into a single integrated circuit, or a single package.

The baseband circuitry or processor 1310 may be implemented, for example, as a solder-down substrate including one or more integrated circuits, a single packaged integrated circuit soldered to a main circuit board or a multi-chip module containing two or more integrated circuits. Furthermore, the baseband circuitry or processor 1310 may cause transmission of various resources.

The platform 1300 may also include interface circuitry (not shown) that is used to connect external devices with the platform 1300. The interface circuitry may communicatively couple one interface to another. The external devices CONNECTED to the platform 1300 via the interface circuitry include sensor circuitry 1321 and electro-mechanical components (EMCs) 1322, as well as removable memory devices coupled to removable memory circuitry 1323.

A battery 1330 may power the platform 1300, although in some examples the platform 1300 may be mounted deployed in a fixed location, and may have a power supply coupled to an electrical grid. The battery 1330 may be a lithium ion battery, a metal-air battery, such as a zinc-air battery, an aluminum-air battery, a lithium-air battery, and the like. In some implementations, such as in V2X applications, the battery 1330 may be a typical lead-acid automotive battery.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium or a non-transitory computer readable medium using instructions stored in a memory. Many other examples and variations are possible within the scope of the claimed disclosure.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components or devices, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units. The processor or baseband processor can be configured to execute instructions described herein.

A UE or a BS, for example the UE 101 or BS 111 of FIG. 1 can comprise a memory interface and processing circuitry communicatively coupled to the memory interface configured to execute instructions described herein.

Examples (aspects) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to aspects and examples described herein.

Example 1 is a baseband processor of a user equipment (UE) comprising: one or more processors configured to: transmit UE capability information including a frequency separation threshold, wherein the frequency separation threshold represents a frequency separation from a carrier bandwidth (CBW) of the UE; receive a reference signal (RS) within the frequency separation threshold and outside of the CBW; and perform a layer 1 (L1) operation based on the RS.

Example 2 includes Example 2, wherein the UE capability information comprises a UE type, the UE type indicating a relationship between the CBW and an actual bandwidth of the UE.

Example 3 includes Example 2, further configured to determine at least one or more of: subcarrier spacing (SCS) of the RS and a SCS of a physical downlink control channel (PDCCH) or a physical downlink shared channel (PDSCH) are the same, or; the UE supports simultaneous reception of data with different numerology; and subsequently communicate data or reference signals in an uplink or downlink signaling in response to determining at least one or more of the SCS of the RS and the SCS of the PDCCH or the PDSCH are the same, or the UE supports simultaneous reception of data with different numerology.

Example 4 includes Example 2, further configured to determine that a subcarrier spacing (SCS) of the RS and a SCS of a physical downlink control channel (PDCCH) or a physical downlink shared channel (PDSCH) are different and determine that the UE does not support simultaneous reception of data with different numerology; and subsequently schedule a restriction where the RS is prioritized over one or more of a physical channel uplink transmission, a physical channel downlink reception, performing measurements, or receiving other RSs.

Example 5 includes Example 2, further configured to determine that the UE does not support independent beam management (IBM); and subsequently schedule a restriction where the RS is prioritized over one or more of a physical channel uplink transmission, a physical channel downlink reception, performing measurements, or receiving other RSs.

Example 6 includes Example 2, further configured to determine that the RS is a channel state information reference signal (CSI-RS) configured in a CSI-RS resource set without repetition and wherein the CSI-RS is type-D quasi co-located (QCLed) with an active transmission control indicator (TCI) state for a physical downlink control channel (PDCCH) or a physical downlink shared channel (PDSCH) reception; and subsequently communicate data or reference signals in an uplink or downlink signaling in response to determining that the RS is a CSI-RS configured in a CSI-RS resource set without repetition and wherein the CSI-RS is type-D QCLed with an active TCI state for the PDCCH or PDSCH reception.

Example 7 includes Example 2, wherein the actual bandwidth is at least as wide as the frequency separation threshold.

Example 8 includes Example 2, wherein the actual bandwidth is a first bandwidth that is less than the frequency separation threshold, and the one or more processors are further configured to: schedule a first interruption before reception of the RS wherein the actual bandwidth is reconfigured to a second bandwidth that is at least as wide as the frequency separation threshold, subsequently receive the RS, and after receiving the RS, schedule a second interruption wherein the actual bandwidth is reconfigured to the first bandwidth.

Example 9 includes Example 2, wherein the actual bandwidth is less than the frequency separation threshold, and the actual bandwidth is configured according to a first radio frequency (RF) chain; wherein the one or more processors further configure a second actual bandwidth that is different from the actual bandwidth according to a second RF chain, wherein the second actual bandwidth overlaps with the RS; and receive the RS according to the second actual bandwidth.

Example 10 includes Example 1, wherein the frequency separation threshold is defined between furthest band edges of the CBW and the RS.

Example 11 includes Example 1, wherein the frequency separation threshold is defined between neighboring band edges of the CBW and the RS.

Example 12 includes Example 1, wherein the frequency separation threshold is defined between a center frequency of the CBW and a center frequency of the RS.

Example 13 includes Example 1, wherein the frequency separation threshold defined based on a per frequency range basis, a per frequency band basis, or a per frequency band and frequency band combination basis.

Example 14 includes Example 1, wherein the frequency separation threshold defined based on a configured component carrier or based on a carrier aggregation configuration according to a subcarrier spacing or a bandwidth class.

Example 15 includes Example 1, wherein the frequency separation threshold defined based a received configuration of a carrier bandwidth.

Example 16 is a user equipment (UE), comprising: a radio frequency (RF) transceiver and one or more processors configured to, when executing instructions stored in a memory, cause the UE to: transmit UE capability information including a frequency separation threshold, wherein the frequency separation threshold represents a frequency separation from a carrier bandwidth (CBW) of the UE; receive a reference signal (RS) outside of the frequency separation threshold and outside of the CBW; and perform a layer 1 (L1) operation based on the RS.

Example 17 includes Example 16, further configured to receive configuration of a measurement gap; and reconfigure an actual bandwidth of the UE to overlap with a frequency of the RS, and receive the RS during the measurement gap.

Example 18 includes Example 16, wherein the RS is a layer 1 RS (L1-RS) associated with beam monitoring, radio link monitoring, or beam failure detection and recovery.

Example 19 is base station (BS), comprising a radio frequency (RF) transceiver and one or more processors configured to, when executing instructions stored in a memory, cause the BS to: receive user equipment (UE) capability information including a frequency separation threshold and a UE type, wherein the frequency separation threshold represents a frequency separation from a carrier bandwidth (CBW) of the UE and the UE type indicates a relationship between the CBW and an actual bandwidth of the UE; and transmit a reference signal (RS) within the frequency separation threshold and outside of the CBW, or transmit the RS outside of the frequency separation threshold and outside of the CBW.

Example 20 includes Example 19, further configured to transmit a configuration of a measurement gap associated with the RS, and the RS is transmitted during the measurement gap.

A method as substantially described herein with reference to each or any combination substantially described herein, comprised in examples 1-20, and in the Detailed Description.

A non-transitory computer readable medium as substantially described herein with reference to each or any combination substantially described herein, comprised in examples 1-20, and in the Detailed Description.

A wireless device configured to perform any action or combination of actions as substantially described herein, comprised in examples 1-20, and in the Detailed Description.

An integrated circuit configured to perform any action or combination of actions as substantially described herein, comprised in examples 1-20, and in the Detailed Description.

An apparatus configured to perform any action or combination of actions as substantially described herein, comprised in examples 1-20, and in the Detailed Description.

A baseband processor configured to perform any action or combination of actions as substantially described herein, comprised in examples 1-20, and in the Detailed Description.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communication media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal or apparatus.

In this regard, while the disclosed subject matter has been described in connection with various aspects and corresponding Figures, where applicable, it is to be understood that other similar aspects can be used or modifications and additions can be made to the described aspects for performing the same, similar, alternative, or substitute function of the disclosed subject matter without deviating therefrom. Therefore, the disclosed subject matter should not be limited to any single aspect described herein, but rather should be construed in breadth and scope in accordance with the appended claims below.

In particular regard to the various functions performed by the above described components or devices (assemblies, devices, circuits, systems, etc.), the terms (including a reference to a "means") used to describe such components or devices are intended to correspond, unless otherwise indicated, to any component, device, or structure which performs the specified function of the described component or device (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

The present disclosure is described with reference to the attached drawing figures, wherein like reference numerals are used to refer to like elements, devices, or components throughout, and wherein the illustrated structures and devices are not necessarily drawn to scale. As utilized herein, terms "device," "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable or non-transitory computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor of a user equipment (UE), comprising:
   one or more processors configured to:
      generate, for transmission, UE capability information including a frequency separation threshold, wherein the frequency separation threshold represents a frequency separation from a carrier bandwidth (CBW) of the UE;
      receive a reference signal (RS) within the frequency separation threshold and outside of the CBW; and
      perform a layer 1 (L1) operation based on the RS.

2. The baseband processor of claim 1, wherein the UE capability information comprises a UE type, the UE type indicating a relationship between the CBW and an actual bandwidth of the UE.

3. The baseband processor of claim 2, further configured to determine at least one or more of:
   subcarrier spacing (SCS) of the RS and a SCS of a physical downlink control channel (PDCCH) or a physical downlink shared channel (PDSCH) are the same, or;
   the UE supports simultaneous reception of data with different numerology; and subsequently
   communicate data or reference signals in an uplink or downlink signaling in response to determining at least one or more of the SCS of the RS and the SCS of the PDCCH or the PDSCH are the same, or the UE supports simultaneous reception of data with different numerology.

4. The baseband processor of claim 2, further configured to determine that a subcarrier spacing (SCS) of the RS and a SCS of a physical downlink control channel (PDCCH) or a physical downlink shared channel (PDSCH) are different and determine that the UE does not support simultaneous reception of data with different numerology; and subsequently
   schedule a restriction where the RS is prioritized over one or more of a physical channel uplink transmission, a physical channel downlink reception, performing measurements, or receiving other RSs.

5. The baseband processor of claim 2, further configured to determine that the UE does not support independent beam management (IBM); and subsequently
   schedule a restriction where the RS is prioritized over one or more of a physical channel uplink transmission, a physical channel downlink reception, performing measurements, or receiving other RSs.

6. The baseband processor of claim 2, further configured to determine that the RS is a channel state information reference signal (CSI-RS) configured in a CSI-RS resource set without repetition and wherein the CSI-RS is type-D quasi co-located (QCLed) with an active transmission control indicator (TCI) state for a physical downlink control channel (PDCCH) or a physical downlink shared channel (PDSCH) reception; and subsequently communicate data or reference signals in an uplink or downlink signaling in response to determining that the RS is a CSI-RS configured in a CSI-RS resource set without repetition and wherein the CSI-RS is type-D QCLed with an active TCI state for the PDCCH or PDSCH reception.

7. The baseband processor of claim 2, wherein the actual bandwidth is at least as wide as the frequency separation threshold.

8. The baseband processor of claim 2, wherein the actual bandwidth is a first bandwidth that is less than the frequency separation threshold, and the one or more processors are further configured to:
schedule a first interruption before reception of the RS wherein the actual bandwidth is reconfigured to a second bandwidth that is at least as wide as the frequency separation threshold, subsequently receive the RS, and after receiving the RS, schedule a second interruption wherein the actual bandwidth is reconfigured to the first bandwidth.

9. The baseband processor of claim 2, wherein the actual bandwidth is less than the frequency separation threshold, and the actual bandwidth is configured according to a first radio frequency (RF) chain;
wherein the one or more processors further configure a second actual bandwidth that is different from the actual bandwidth according to a second RF chain, wherein the second actual bandwidth overlaps with the RS; and
receive the RS according to the second actual bandwidth.

10. The baseband processor of claim 1, wherein the frequency separation threshold is defined between furthest band edges of the CBW and the RS.

11. The baseband processor of claim 1, wherein the frequency separation threshold is defined between neighboring band edges of the CBW and the RS.

12. The baseband processor of claim 1, wherein the frequency separation threshold is defined between a center frequency of the CBW and a center frequency of the RS.

13. The baseband processor of claim 1, wherein the frequency separation threshold defined based on a per frequency range basis, a per frequency band basis, or a per frequency band and frequency band combination basis.

14. The baseband processor of claim 1, wherein the frequency separation threshold defined based on a configured component carrier or based on a carrier aggregation configuration according to a subcarrier spacing or a bandwidth class.

15. The baseband processor of claim 1, wherein the frequency separation threshold is defined based on a received configuration of a carrier bandwidth.

16. A user equipment (UE), comprising:
a radio frequency (RF) transceiver and one or more processors configured to, when executing instructions stored in a memory, cause the UE to:
transmit UE capability information including a frequency separation threshold, wherein the frequency separation threshold represents a frequency separation from a carrier bandwidth (CBW) of the UE;
receive a reference signal (RS) outside of the frequency separation threshold and outside of the CBW; and
perform a layer 1 (L1) operation based on the RS.

17. The UE of claim 16, further configured to receive configuration of a measurement gap; and
reconfigure an actual bandwidth of the UE to overlap with a frequency of the RS, and receive the RS during the measurement gap.

18. The UE of claim 16, wherein the RS is a layer 1 RS (L1-RS) associated with beam monitoring, radio link monitoring, or beam failure detection and recovery.

19. A base station (BS), comprising radio frequency (RF) transceiver and one or more processors configured to, when executing instructions stored in a memory, cause the BS to:
receive user equipment (UE) capability information including a frequency separation threshold and a UE type, wherein the frequency separation threshold represents a frequency separation from a carrier bandwidth (CBW) of the UE and the UE type indicates a relationship between the CBW and an actual bandwidth of the UE; and
transmit a reference signal (RS) within the frequency separation threshold and outside of the CBW, or transmit the RS outside of the frequency separation threshold and outside of the CBW.

20. The BS of claim 19, further configured to transmit a configuration of a measurement gap associated with the RS, and the RS is transmitted during the measurement gap.

* * * * *